United States Patent
Song et al.

(10) Patent No.: US 9,532,065 B2
(45) Date of Patent: Dec. 27, 2016

(54) IMAGE-FILTERING METHOD AND APPARATUS, AND ENCODING/DECODING METHOD AND APPARATUS USING SAME

(75) Inventors: Jinhan Song, Seoul (KR); Jeongyeon Lim, Seongnam-si (KR); Yunglyul Lee, Seoul (KR); Joohee Moon, Seoul (KR); Haekwang Kim, Seoul (KR); Byeungwoo Jeon, Seongnam-si (KR); Jongki Han, Seoul (KR); Daeyeon Kim, Seoul (KR); Sungwook Hong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 13/697,520

(22) PCT Filed: May 12, 2011

(86) PCT No.: PCT/KR2011/003507
§ 371 (c)(1),
(2), (4) Date: Nov. 12, 2012

(87) PCT Pub. No.: WO2011/142603
PCT Pub. Date: Nov. 17, 2011

(65) Prior Publication Data
US 2013/0058401 A1     Mar. 7, 2013

(30) Foreign Application Priority Data

May 12, 2010 (KR) .................. 10-2010-0044687
May 20, 2010 (KR) .................. 10-2010-0047302

(51) Int. Cl.
H04N 7/12          (2006.01)
H04N 11/02         (2006.01)
(Continued)

(52) U.S. Cl.
CPC .......... H04N 19/44 (2014.11); H04N 19/117 (2014.11); H04N 19/157 (2014.11);
(Continued)

(58) Field of Classification Search
CPC ....................... H04N 7/50; H04N 7/26271
(Continued)

(56) References Cited

U.S. PATENT DOCUMENTS 6,539,060 B1    3/2003   Lee et al.
7,447,337 B2 *  11/2008  Zhang ............... G06K 9/00711
                                                 348/699

(Continued)

FOREIGN PATENT DOCUMENTS

KR    1020100045007    5/2010
KR    1020100046289    5/2010
(Continued)

OTHER PUBLICATIONS

Advanced video coding for generic audiovisual services, Series H: Audiovisual and Multimedia Systems Infrastructure of audiovisual services—Coding of moving video, ITU-T Recommendation H.264, Mar. 2005, pp. 1-324.
(Continued)

Primary Examiner — Chikaodili E Anyikire
(74) Attorney, Agent, or Firm — Hauptman Ham, LLP

(57) ABSTRACT

An image filtering apparatus and method and a video encoding/decoding apparatus and method using the same are disclosed. The image filtering apparatus includes: a boundary identifying unit for identifying a boundary between two transform blocks included in an image; a pixel/strength selecting unit for selecting a filtering strength according to a size of at least one transform block among the two transform blocks; and a filtering unit for filtering at least one pixel included in a region adjacent to the boundary.

12 Claims, 12 Drawing Sheets

(51) Int. Cl.
*H04N 11/04* (2006.01)
*H04N 19/44* (2014.01)
*H04N 19/86* (2014.01)
*H04N 19/61* (2014.01)
*H04N 19/80* (2014.01)
*H04N 19/176* (2014.01)
*H04N 19/117* (2014.01)
*H04N 19/157* (2014.01)
*H04N 19/82* (2014.01)

(52) U.S. Cl.
CPC ........... *H04N 19/176* (2014.11); *H04N 19/61* (2014.11); *H04N 19/80* (2014.11); *H04N 19/82* (2014.11); *H04N 19/86* (2014.11)

(58) Field of Classification Search
USPC ........................................ 375/240.01, 240.29
See application file for complete search history.

(56) References Cited

U.S. PATENT DOCUMENTS

| | | | | |
|---|---|---|---|---|
| 2003/0156648 | A1* | 8/2003 | Holcomb | H04N 19/136 375/240.18 |
| 2005/0201633 | A1* | 9/2005 | Moon | H04N 19/176 382/268 |
| 2006/0146941 | A1* | 7/2006 | Cha | H04N 19/61 375/240.29 |
| 2006/0182181 | A1* | 8/2006 | Lee | H04N 19/176 375/240.24 |
| 2007/0140354 | A1* | 6/2007 | Sun | H04N 19/29 375/240.24 |
| 2009/0003447 | A1* | 1/2009 | Christoffersen | H04N 19/61 375/240.16 |
| 2009/0034622 | A1* | 2/2009 | Huchet | H04N 19/176 375/240.16 |
| 2010/0328425 | A1* | 12/2010 | Nagaraj | G06T 9/001 348/42 |
| 2011/0200100 | A1 | 8/2011 | Kim et al. | |
| 2011/0200103 | A1 | 8/2011 | Kim et al. | |

FOREIGN PATENT DOCUMENTS

| | | |
|---|---|---|
| KR | 1020100046732 | 5/2010 |
| WO | 2010/047499 | 4/2010 |
| WO | 2010039822 A2 | 4/2010 |
| WO | 2010/050699 | 5/2010 |

OTHER PUBLICATIONS

McCann, Ken et al., Samsung's Response to the Call for Proposals on Video Compression Technology, Joint Collaborative Team on Video Coding (JCT-VC), of ITU-T SG16 WP3 and ISO/IEC JTC1/SC29/WG11, Apr. 15-23, 2010, Document No. JCTVC-A124, pp. 1-42, Dresden, DE.

Office Action for corresponding Korean application dated Dec. 15, 2014.

Mathias Wien, Variable Block-Size Transforms for H.264/AVC, IEEE Transaction on circuits and systems for video technology, Jul. 2003, pp. 604-613, vol. 13, No. 7.

Jens-Rainer Ohm, Multimedia Communication Technology: Representation, Transmission and Identification of Multimedia Signals, Published by Springer-Verlag Berlin Heidelberg New York in 2004, pp. 180-183, XP-002492449.

Peter List et al. Adaptive Deblocking Filter, IEEE Transaction on circuits and systems for video technology, Jul. 2003, pp. 614-619, vol. 13, No. 7.

International Search Report mailed Feb. 10, 2012 for PCT/KR2011/003507.

* cited by examiner

Vertical : 0

Horizontal : 1

DC : 2

MEAN
(A,B,C,D,E,F,G,H,
Q,R,S,T,U,V,W,X)

Diagonal down-left : 3

Diagonal down-right : 4

Vertical-right : 5

Horizontal-down : 6

Vertical-left : 7

Horizontal-up : 8

IMAGE-FILTERING METHOD AND APPARATUS, AND ENCODING/DECODING METHOD AND APPARATUS USING SAME

CROSS REFERENCE TO RELATED APPLICATIONS

This application claims the priority of Korean Patent Application No. 10-2010-0044687, filed on May 12, 2010 and Korean Patent Application No. 10-2010-0047302, filed on May 20, 2010 in the KIPO (Korean Intellectual Property Office). Further, this application is the National Phase application of International Application No. PCT/KR2011/003507, filed on May 12, 2011, which designates the United States and was published in Korean.

TECHNICAL FIELD

The present disclosure relates to an image filtering apparatus and method and a video encoding/decoding apparatus and method using the same. More particularly, the present disclosure relates to an image filtering apparatus and method that can be applied to an apparatus for searching a suitable subblock type for when an M×N (M and N: natural numbers) macroblock is used in video encoding/decoding and performing compression and reconstruction through block transform/quantization suitable for the searched type, and can improve video encoding/decoding efficiency by recognizing a transform size determined through a bitstream or various information and applying filtering to a transform boundary with the number of pixels to be filtered and the method of filtering varied according to the transform size, and relates to a video encoding/decoding apparatus and method using the same.

BACKGROUND

The statements in this section merely provide background information related to the present disclosure and may not constitute prior art.

Moving Picture Experts Group (MPEG) and Video Coding Experts Group (VCEG) together stepped ahead of the existing MPEG-4 Part 2 and H.263 standard methods to develop a better and more excellent video compression technology. The new standard is called H.264/AVC (Advanced Video Coding) and was released simultaneously as MPEG-4 Part 10 AVC and ITU-T Recommendation H.264.

In the H.264/AVC standard, a residual signal is generated by performing an intra/inter prediction process in units of a macroblock having various types of subblocks, and encoding is performed after further reducing the number of bits by performing a transform/quantization process on the residual signal generated. In a conventional encoding method based on a macroblock, an encoder divides an input image in a 16×16 macroblock, generates a residual block by predicting each macroblock by a size of a sub-macroblock available according to an inter/intra mode, generates a frequency coefficient by applying integer transform designed based on 4×4 or 8×8 discrete cosine transform (DCT), to the residual block generated, and quantizes the frequency coefficient according to a predetermined quantization parameter (QP). In addition, a blocking effect caused by the transform/quantization process is reduced through loop filtering.

Loop filtering in H.264/AVC (deblocking filtering) is performed in units of a macroblock such as a 16×16 block, an 8×8 block, and a 4×4 block. The main purpose of loop filtering is to remove a blocking effect, and such a blocking effect is generated not in units of a macroblock but in unit of a transform. Since H.264/AVC performs loop filtering along boundaries of a 16×16 macroblock and 4×4 and 8×8 blocks, it is unsuitable for an M×N block size (M may be equal to N) and P×Q transform (P may be equal to Q) and has a problem of applying a filtering coefficient and depth (the number of pixels to be filtered) that is unsuitable for P×Q transform, to a filtering boundary. In addition, it has a problem of failing to variably apply a filtering strength and the number of pixels, as a block size and a transform size increase. Therefore, when various block sizes and transforms are used in high-quality video encoding/decoding technology to be developed in the future, a blocking effect cannot be effectively removed by loop filtering, thus leading to degradation of subjective/objective performance.

DISCLOSURE

Technical Problem

Therefore, to solve the above-mentioned problems, the present disclosure seeks to improve encoding/decoding performance by using various types of relevant square or rectangular transforms in performing encoding in units of a macroblock suitable for a video, performing loop filtering on each transform boundary by recognizing information on various transform types applied to each block by using a bitstream or various types of information, and applying various types of filtering by determining the effective number of filtering pixels and an effective filtering method according to a block size and a transform size.

SUMMARY

An embodiment of the present disclosure provides a video encoding/decoding apparatus including: a video encoding unit for generating a predicted block by predicting a current block, generating a residual block by subtracting the predicted block from the current block, transforming/quantizing the residual block according to a block type of the current block, generating encoded video data by encoding a transformed/quantized residual block, decoding a residual block by inverse-quantizing/transforming the transformed/quantized residual block, generating a reconstructed block by adding the predicted block to a decoded residual block, and filtering a boundary region between the reconstructed block and an adjacent block according to a transform type; and a video decoding unit for outputting a transformed/quantized residual block by decoding encoded data, decoding a residual block by inverse-quantizing/transforming the transformed/quantized residual block according to a transform/quantization type, generating a predicted block by predicting a current block, reconstructing the current block by adding a decoded residual block and the predicted block, and filtering a boundary region between a reconstructed current block and an adjacent block according to the transform/quantization type.

Another embodiment of the present disclosure provides a video encoding apparatus including: a predicting unit for generating a predicted block by predicting a current block; a subtracting unit for generating a residual block by subtracting the predicted block from the current block; a transforming/quantizing unit for transforming/quantizing the residual block according to a block type of the current block; an encoding unit for generating encoded video data by encoding a transformed/quantized residual block; an inverse quantizing/transforming unit for decoding a residual block by inverse-quantizing/transforming the transformed/quantized residual block; an adding unit for generating a reconstructed block by adding the predicted block to a decoded residual block; and a filtering unit for filtering a boundary region between the reconstructed block and an adjacent block according to a transform type.

The filtering unit may determine whether a boundary between the reconstructed block and the adjacent block is a transform boundary.

If the boundary is a transform boundary, the filtering unit may filter the boundary region.

If the boundary does not correspond to an edge of a video, the filtering may be performed.

The filtering may determine a boundary strength according to the transform type.

The filtering unit may determine a boundary pixel involved in the filtering according to a transform size.

Rate-distortion (RD) costs for a plurality of transform types of the residual block may be calculated, and a transform type with the least RD cost calculated may be selected as a transform/quantization type.

A size of one side of a block transformed/quantized may be equal to or larger than 16.

The transforming/quantizing unit may generate information on a transform/quantization type.

The filtering unit may perform filtering in the same order as in a video decoding apparatus.

Yet another embodiment of the present disclosure provides a video decoding apparatus including: a decoder for outputting a transformed/quantized residual block by decoding encoded data; an inverse quantizing/transforming unit for decoding the residual block by inverse-quantizing/transforming the transformed/quantized residual block according to a transform/quantization type; a predictor for generating a predicted block by predicting a current block; an adder for reconstructing the current block by adding a decoded residual block and the predicted block; and a filtering unit for filtering a boundary region between a reconstructed current block and an adjacent block according to the transform/quantization type.

The filtering unit may determine whether a boundary between the reconstructed block and the adjacent block is a transform boundary.

If the boundary is a transform boundary, the filtering unit may filter the boundary region.

If the boundary does not correspond to an edge of a video, the filtering may be performed.

The filtering unit may determine a boundary strength according to the transform type.

The filtering may determine a boundary pixel involved in the filtering according to a transform size.

The transform/quantization type may be selected according to a transform type included in the encoded data among a plurality of transform types.

A size of one side of a block transformed/quantized may be equal to or larger than 16.

The inverse transforming/quantizing unit may generate information on the transform/quantization type.

The filtering unit may perform filtering in the same order as in a video encoding apparatus.

Yet another embodiment of the present disclosure provides an image filtering apparatus including: a boundary identifying unit for identifying a boundary between two transform blocks included in an image; a pixel/strength selecting unit for selecting one or more pixels to be filtered, according to a size of at least one transform block among the two transform blocks; and a filtering unit for filtering at least one pixel included in a region adjacent to the boundary.

The size of the at least one transform block may be a length of the at least one transform block in a perpendicular direction with respect to the boundary.

The size of the at least one transform block may be proportional to the number of pixels to be filtered.

The size of the at least one transform block may be proportional to the filtering strength.

Yet another embodiment of the present disclosure provides a video encoding/decoding method including: generating a predicted block by predicting a current block, generating a residual block by subtracting the predicted block from the current block, determining a transform/quantization type selected according to a block type of the current block, transforming/quantizing the residual block according to the transform/quantization type determined, generating encoded video data by encoding a transformed/quantized residual block, reconstructing a residual block by inverse-quantizing/transforming the transformed/quantized residual block, generating a reconstructed block by adding the predicted block to a reconstructed residual block, and filtering a boundary region between the reconstructed block and an adjacent block according to the transform/quantization type; and outputting a transformed/quantized residual block by decoding encoded data, decoding a residual block by inverse-quantizing/transforming the transformed/quantized residual block according to a transform/quantization type, generating a predicted block by predicting a current block, reconstructing the current block by adding a decoded residual block and the predicted block, and filtering a reconstructed current block according to the transform/quantization type.

Yet another embodiment of the present disclosure provides a video encoding method including: generating a predicted block by predicting a current block; generating a residual block by subtracting the predicted block from the current block; determining a transform/quantization type selected according to a block type of the current block, and transforming/quantizing the residual block according to the transform/quantization type determined; generating encoded video data by encoding a transformed/quantized residual block; reconstructing a residual block by inverse-quantizing/transforming the transformed/quantized residual block; generating a reconstructed block by adding the predicted block to a reconstructed residual block; and filtering a boundary region between the reconstructed block and an adjacent block according to the transform/quantization type.

Yet another embodiment of the present disclosure provides a video decoding method including: outputting a transformed/quantized residual block by decoding encoded data; decoding a residual block by inverse-quantizing/transforming the transformed/quantized residual block according to a transform/quantization type; generating a predicted block by predicting a current block; reconstructing the current block by adding a decoded residual block and the predicted block; and filtering a reconstructed current block according to the transform/quantization type.

Yet another embodiment of the present disclosure provides an image filtering method including: identifying a boundary between two transform blocks included in an image; and filtering at least one pixel included in a region adjacent to the boundary, wherein the filtering step includes selecting one or more pixels to be filtered, according to a size of at least one transform block among the two transform blocks.

Advantageous Effects

According to the embodiments of the present disclosure as described above, in an apparatus performing transform/quantization of a P×Q size and an M×N macroblock available in a video encoding/decoding apparatus, filtering is performed on all boundaries where a blocking effect is generated at a macroblock boundary and a boundary between transforms, thereby improving the subjective/objective video quality and performance of the encoding/decoding apparatus as compared to the conventional method.

DETAILED DESCRIPTION

Figure 1:
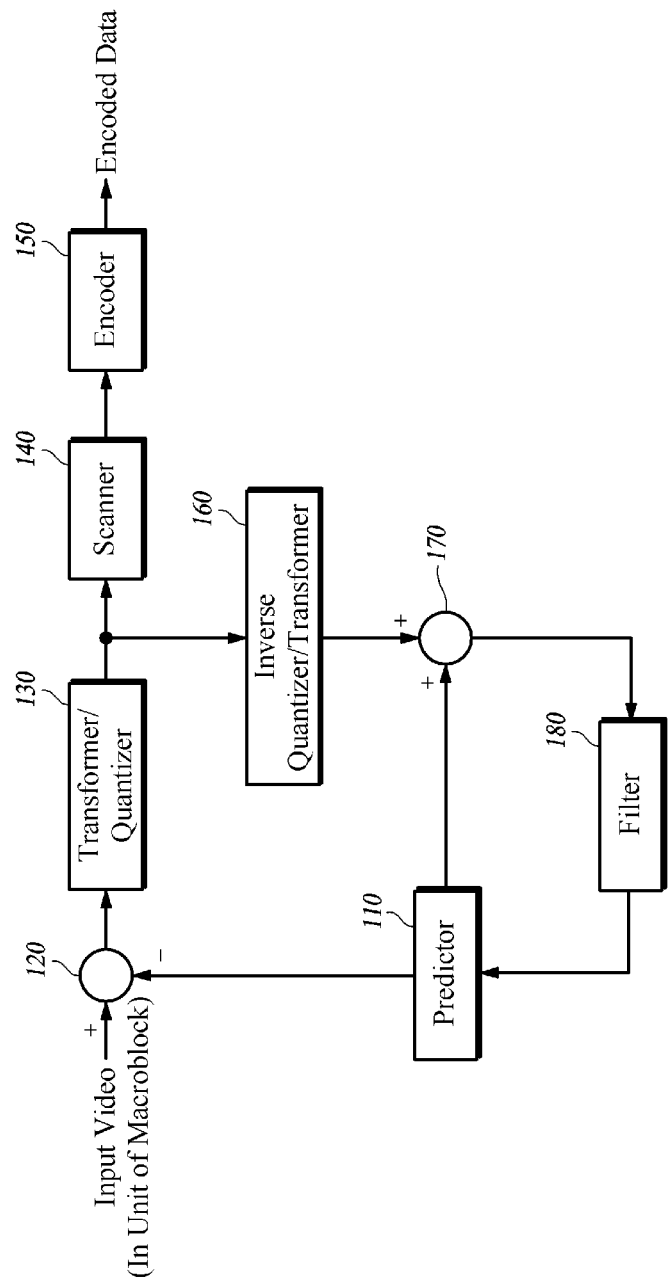
FIG. 1 is a block diagram illustrating a schematic configuration of a video encoding apparatus according to an embodiment of the present disclosure.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a block diagram illustrating a schematic configuration of a video encoding apparatus according to an embodiment.

For encoding videos, a video encoding apparatus 100 may include a predictor 110, a subtractor 120, a transformer/quantizer 130, a scanner 140, an encoder 150, an inverse quantizer/transformer 160, an adder 170, and a filter 180. The video encoding apparatus 100 may be a personal computer or PC, TV, notebook or laptop computer, personal digital assistant or PDA, portable multimedia player or PMP, PlayStation Portable or PSP, mobile communication terminal or digital TV, and may represent a variety of apparatuses equipped with, for example, a communication device such as a modem for carrying out communication between various devices or wired/wireless communication networks, a memory for storing data and various programs for coding images, and a microprocessor for executing the programs to effect operations and controls.

An input video to be encoded may be inputted in units of a block, and the block may be a macroblock. In an embodiment of the present disclosure, a type of a macroblock may be M×N. Herein, M and N may be a natural number having a value of 2n (n: an integer equal to or greater than 1). Specifically, M and N may be greater than 16 and may be different integers or the same integer. In addition, different types of blocks may be used for respective frames to be encoded, and information thereon, that is, information on a block type may be encoded in each frame so that a video decoding apparatus can determine a block type of a frame to be decoded when decoding encoded data. A type of a block to be used may be determined by encoding a current frame into various types of blocks and selecting a block providing the optimal efficiency, or by analyzing the characteristic of a frame and selecting a block type according to the characteristic analyzed. For example, if a video of a frame has a high horizontal correlation, a horizontally-long block may be selected; and if a video of a frame has a high vertical correlation, a vertically-long block may be selected.

To this end, the video encoding apparatus 100 may further include a block type determiner (not illustrated) for determining a block type, encoding information on the block type, and including the result in encoded data.

The predictor 110 generates a predicted block by predicting a block to be currently encoded in an input video (hereinafter referred to as a current block). Specifically, the predictor 110 generates a predicted block having a predicted pixel value as a pixel value of each pixel, by predicting a current block in an input video by intra prediction or inter prediction.

In order to optimize the predicted pixel value, the block may be divided into smaller blocks prior to prediction, if necessary. That is, a predicted block may be generated in units of subblocks into which a block is divided. Herein, as described above, the block may be an M×N square or rectangular block, and the subblock may be a P×Q block (P and Q may be different from or equal to each other) having a vertical/horizontal size of 2n within the range of a size of a block (or macroblock).

The subtractor 120 generates a residual block by subtracting a predicted block from a current block. Specifically, the subtractor 120 generates a residual block with a residual signal by calculating a difference value between an original pixel value of each pixel of a current block and a predicted pixel value of each pixel of a predicted block.

The transformer/quantizer 130 determines a transform/quantization type according to a block type of a current block, and transforms/quantizes a residual block according to the transform/quantization type determined.

Herein, the sizes of a current block, a predicted block and a residual block may be different from the size of a transform block to be transformed/quantized. That is, the size of a transform block to be transformed/quantized may be selected within the range of the size of a residual block. Herein, the transform block refers to a block corresponding to a transform unit, and includes transform coefficients or pixel values. For example, the transform block refers to a P×Q transform coefficient block encoded by P×Q transform, or a P×Q pixel block decoded by P×Q inverse transform.

The video encoding apparatus 100 according to an embodiment of the present disclosure may transform a residual block by a plurality of available transforms such as 4×4, 8×4, 4×8, 8×8, 16×8, 8×16, and 16×16, and then select the transform having the highest encoding efficiency among them.

For example, if intra prediction or inter prediction is performed in units of a 16×16 block, all of a current block, a predicted block and a residual block have a size of 16×16. When receiving a 16×16 residual block, the transformer/quantizer 130 may divide the 16×16 residual block into two 16×8 subblocks and perform 16×8 transform to output two 16×8 transform coefficient blocks.

The transformer/quantizer 130 transforms a residual signal of a residual block into a frequency domain to generate a residual block with a transform coefficient, and quantizes the residual block to generate a transformed/quantized residual block with a quantized transform coefficient.

When the transformer/quantizer 130 transforms/quantizes a residual block, since a transform process is included in a quantization process, the transform is not completed until the quantization is completed. Herein, a technique to transform a spatial-domain video signal into a frequency-domain signal, such as Hadamard Transform or Discrete Cosine Transform Based Integer Transform (hereinafter simply referred to as integer transform), may be used as the transform method, and various quantization techniques such as Dead Zone Uniform Threshold Quantization (DZUTQ) and Quantization Weighted matrix may be used as the quantization method.

The scanner 140 generates a quantized transform coefficient string by scanning quantized transform coefficients of the residual block transformed/quantized by the transformer/quantizer 130. Herein, the scanning method considers the characteristics of a transform technique, a quantization technique, and a block (macroblock or subblock), and the scanning sequence may be determined so that the scanned quantized transform coefficient string has the minimum strength. Although FIG. 1 illustrates that the scanner 140 is implemented separately from the encoder 150, the scanner 140 may be omitted and its function may be integrated into the encoder 150.

The encoder 150 generates encoded data by encoding a transformed/quantized residual block. Specifically, the encoder 150 generates encoded data by encoding a quantized transform coefficient string generated by scanning the quantized transform coefficients of a residual block transformed/quantized by the transformer/quantizer 130, or by encoding a quantized transform coefficient string generated by being scanned by the scanner 140.

An entropy encoding technology may be used as the encoding technology, although other unlimited encoding technologies may be used as the encoding technology. In addition, the encoder 150 may include not only a bitstream obtained by encoding a quantized transform coefficient string, but also various information necessary to decode an encoded bitstream, in the encoded data. Herein, various information necessary to decode an encoded bitstream may include information on a block type, information on an intra prediction mode (if the prediction mode is an intra prediction mode), information on a motion vector (if the prediction mode is an inter prediction mode), information on a transform/quantization type, and various other information.

The inverse quantizer/transformer 160 reconstructs a residual block by inverse-quantizing/transforming a residual block transformed/quantized by the transformer/quantizer 130. The inverse quantization/transform may be carried out by inversely performing the transform/quantization process of the transformer/quantizer 130. That is, the inverse quantizer/transformer 150 may perform inverse quantization/transform by inversely performing the transform/quantization process of the transformer/quantizer 130 by using transform/quantization related information (e.g., information on a transform/quantization type) generated and transmitted by the transformer/quantizer 130.

The adder 170 reconstructs a current block by adding the predicted block predicted by the predictor 110 and the residual block inverse-quantized/transformed by the inverse quantizer/transformer 160.

The filter 180 filters the current block reconstructed by the adder 170. The filter 180 reduces a blocking effect that is generated at a block boundary or a transform boundary by transform/quantization of a video in units of a block. The filter 180 may perform filtering by using transform/quantization type information transmitted together with a reconstructed current block. The transform/quantization type information may be transmitted by the inverse quantizer/transformer 160 to the adder 170 and then transmitted to the filter 180.

A deblocking filter is used to remove the blocking effect, which may be equivalent to a loop filter. The deblocking filter may also perform filtering on a boundary between blocks (which may be M×N macroblocks), a boundary between transforms according to a P×Q transform size in a macroblock determined by the transformer/quantizer 130, and a boundary between a block and a transform. A P×Q transform type refers to both a square transform type and a rectangular transform type, and a blocking effect is generated by performing transform/quantization according to a transform unit. In order to remove the blocking effect, a deblocking filter may be applied to both a macroblock boundary and a transform boundary. Consequently, filtering may be applied to all boundaries according to a macroblock type and a transform type, so that a filtering process for removing a blocking effect can be applied. As for a filtering method for removing the blocking effect, an embodiment of the present disclosure is different from the conventional H.264/AVC in that it applies a filtering method according to a transform block size in consideration of all the P×Q transform boundaries.

In the conventional H.264, a macroblock type used for video encoding is in 16×16 pixels, and a predicted block is generated by performing intra/inter prediction on each macroblock. An encoding method for encoding a video in units of a macroblock is widely used because it can encode a video in consideration of the regional characteristics of the video. In addition, since various intra/inter predictions are used for generation of a predicted block, a high encoding efficiency can be provided.

Figure 2:
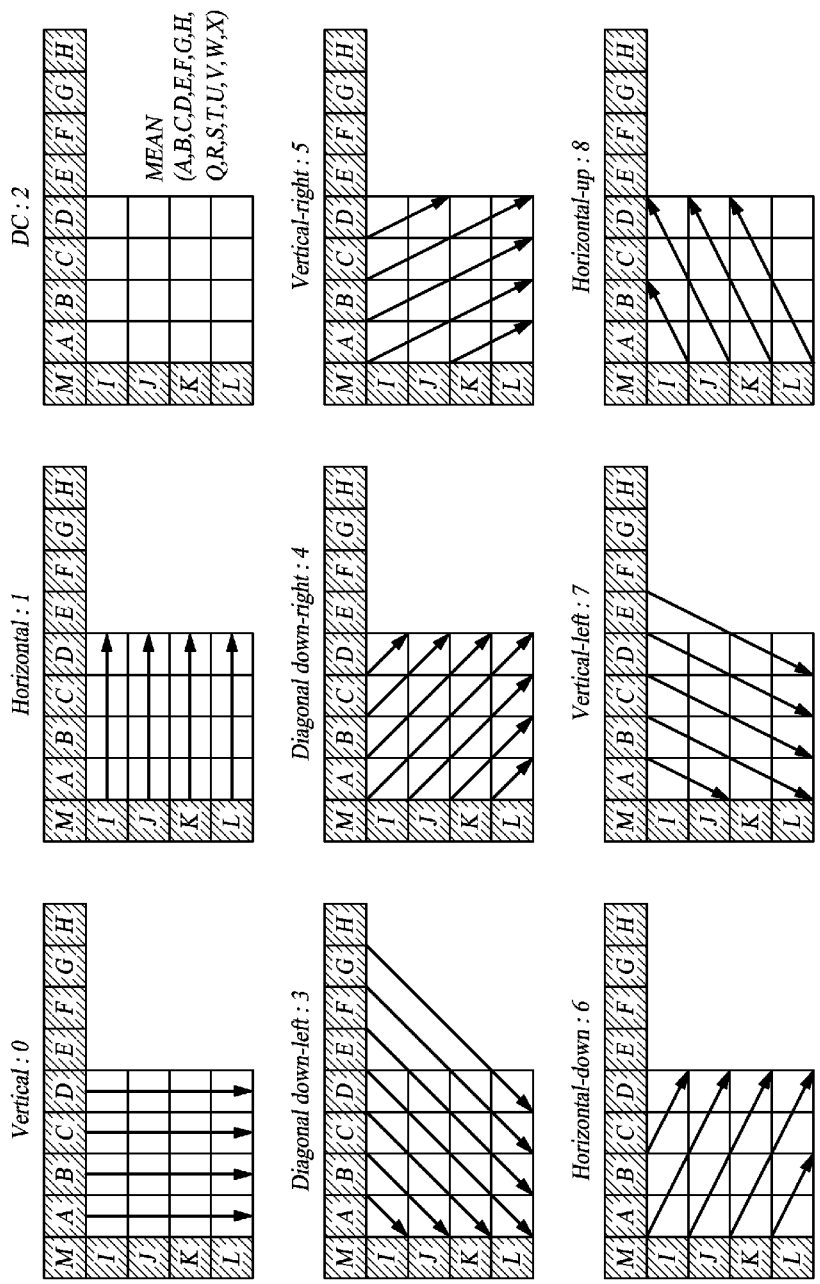
FIGS. 2 to 4 are diagrams illustrating intra prediction modes according to macroblock types used in typical video encoding.
Figure 3:
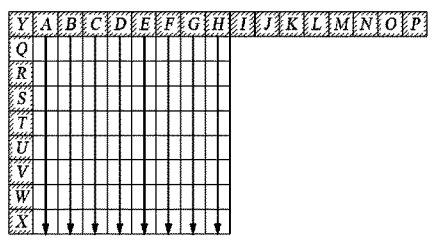
Figure 3:
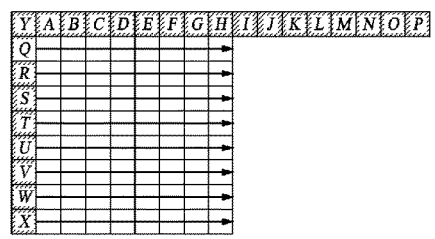
Figure 3:
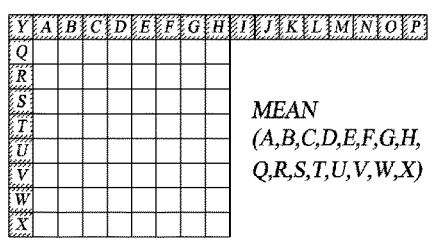
Figure 3:
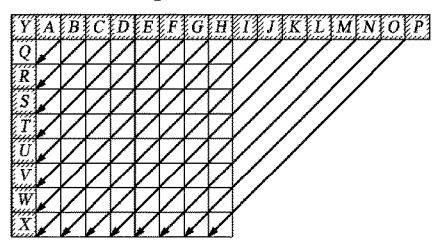
Figure 3:
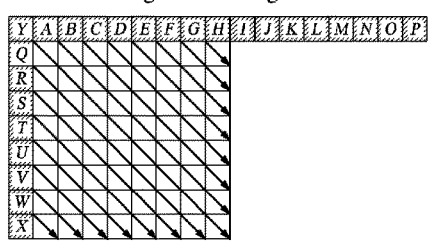
Figure 3:
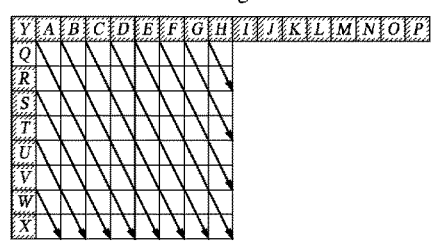
Figure 3:
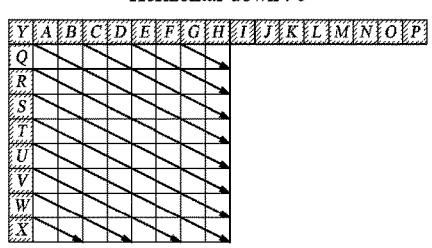
Figure 3:
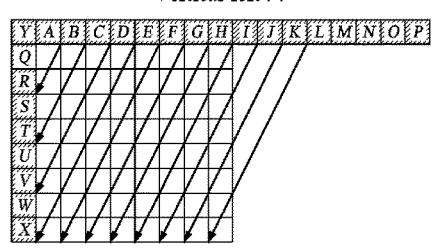
Figure 4:
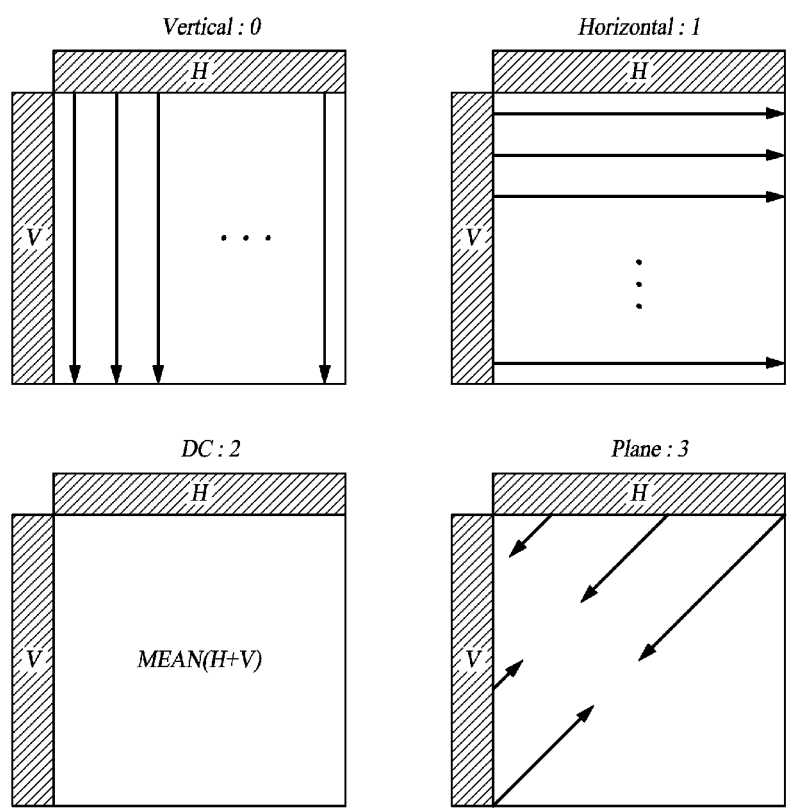

FIGS. 2 to 4 are diagrams illustrating intra prediction modes according to macroblock types used in typical video encoding.

FIG. 2 is a diagram illustrating nine intra prediction modes in the case where a macroblock type is an intra 4×4 macroblock. FIG. 3 is a diagram illustrating nine intra prediction modes in the case where a macroblock type is an intra 8×8 macroblock. FIG. 4 is a diagram illustrating four intra prediction modes in the case where a macroblock type is an intra 16×16 macroblock.

In the case of intra prediction, an encoded adjacent block is used to generate a predicted block in units of a 4×4, 8×8 or 16×16 block as illustrated in FIG. 2. In the case of inter prediction, a previous-encoded frame is used to generate a predicted block in units of a 16×16, 16×8, 8×16 or 8×8 block as illustrated in FIG. 3. If a predicted block is generated in units of an 8×8 block, each 8×8 block is used to generate a predicted block in units of an 8×8, 8×4, 4×8 or 4×4 block.

If a macroblock type is an intra block type, a macroblock to be encoded is predicted by intra prediction. The intra block type is subdivided into an intra 4×4 macroblock, an intra 8×8 macroblock, and an intra 16×16 macroblock. In each case, a macroblock is predicted by using adjacent pixels of an adjacent block that is already encoded, decoded and reconstructed, according to a prediction mode illustrated in FIGS. 2 to 4.

Figure 5:
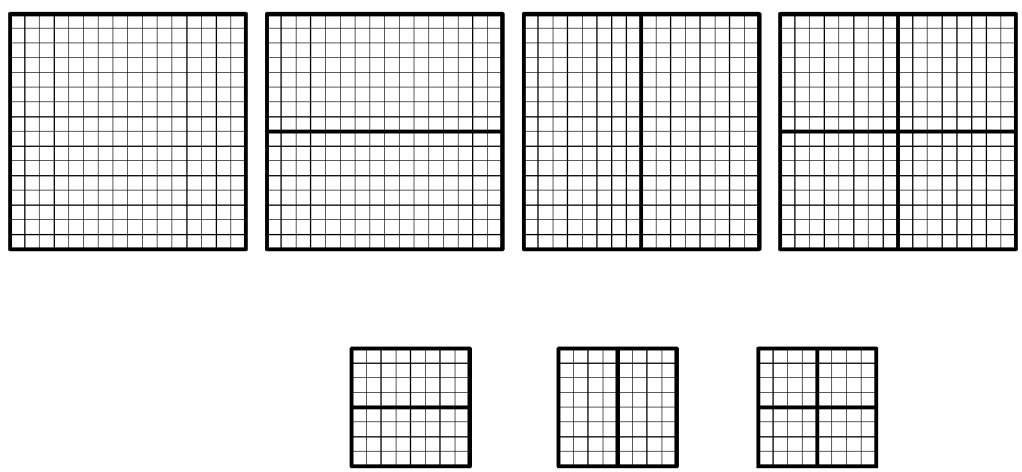
FIG. 5 is a diagram illustrating an inter prediction mode according to a macroblock type used in typical video encoding.

FIG. 5 is a diagram illustrating an inter prediction mode according to a macroblock type used in typical video encoding.

If a macroblock type is an inter block type, a macroblock to be encoded is predicted by inter prediction. In this case, as illustrated in FIG. 3, a macroblock is predicted in units of a 16×16, 16×8, 8×16 or 8×8 block by using a frame that is already encoded, decoded and reconstructed, to generate a predicted block. If a macroblock is predicted in units of an 8×8 block, each 8×8 block is predicted in units of an 8×8, 8×4, 4×8 or 4×4 block to generate a predicted block.

In addition, H.264 uses a 4×4 or 8×8 integer transform based on discrete cosine transform. An integer transform does not perform a real number-based operation that is a drawback of discrete cosine transform, and performs only an integer-based operation while maintaining, to the utmost, the characteristics of discrete cosine transform. Therefore, the integer transform is advantageous in terms of encoding efficiency and complexity. A deblocking filter is used to remove a blocking effect caused by a block-based transform.

However, in the case of encoding a high-resolution video, using various P×Q transforms may be more efficient than using only a 4×4 or 8×8 transform used in H.264. Herein, if a P×Q transform is used, it is necessary to apply a deblocking filter in units of a block as in the conventional H.264/AVC and also to apply a deblocking filter to a portion to be filtered in accordance with various types of transform boundaries. In addition, in the case of filtering, as for a filtering method applied according to various macroblock or transform types, a more improved performance and video quality can be achieved only when a deeper and stronger filtering is performed on a macroblock or transform boundary larger than that of the conventional method.

In an exemplary embodiment of the present disclosure, the filter 180 performs filtering on a transform boundary sized not to be performed in H.264/AVC with respect to a P×Q transform applied to all or some sizes of an M×N macroblock. First, a transform type is identified through various information such as a bitstream or a block type with respect to a transform type determined by the transformer/quantizer 130, and a blocking-effect portion and a non-blocking-effect portion at a boundary between transforms are discriminated from each other. This is to prevent an unnecessary filtering from being applied to the non-blocking-effect portion and to accurately detect information about the non-blocking-effect portion and the blocking-effect portion so that a filtering is applied to a transform boundary position at which a blocking effect is generated.

In an embodiment of the present disclosure, a boundary between transforms, a boundary between a block and a transform, and a boundary between blocks may be divided prior to filtering. Although only the removal of a blocking effect generated at a boundary between transforms is described in the following description, this is merely for the convenience of description, and a filtering method for a boundary between blocks and a filtering method for a boundary between a transform and a block may be fundamentally similar to a filtering method for a boundary between transforms.

In a filtering process, the filter 180 determines a transform boundary, pixels adjacent to the boundary to be filtered, and a filtering strength. Herein, the filtering is performed after determining whether the pixels adjacent to the boundary correspond to an actual edge of a video or a blocking region generated by block transform/quantization.

In embodiments of the present disclosure, a filtering strength has the same meaning as a boundary strength (BS).

Figure 6:
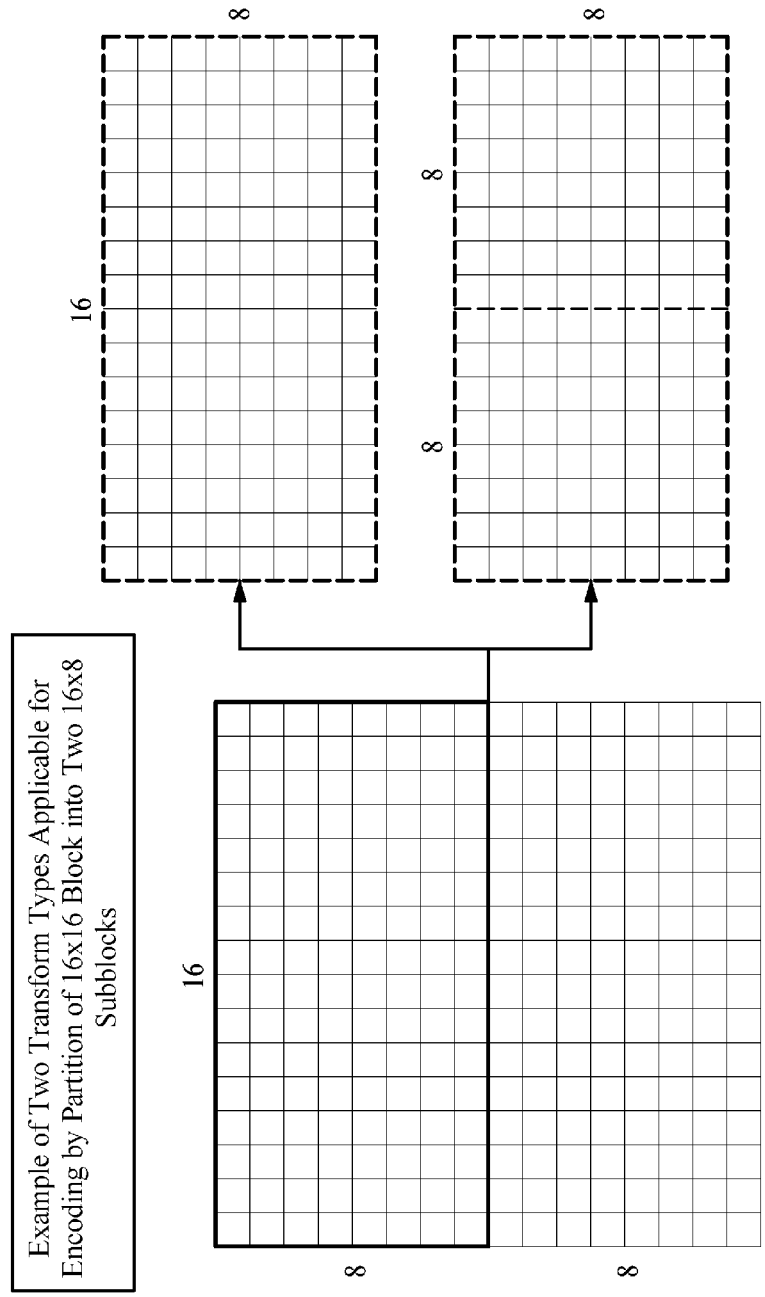
FIG. 6 is a diagram illustrating a method of determining an M×N macroblock type and transform type according to an embodiment of the present disclosure.
Figure 7:
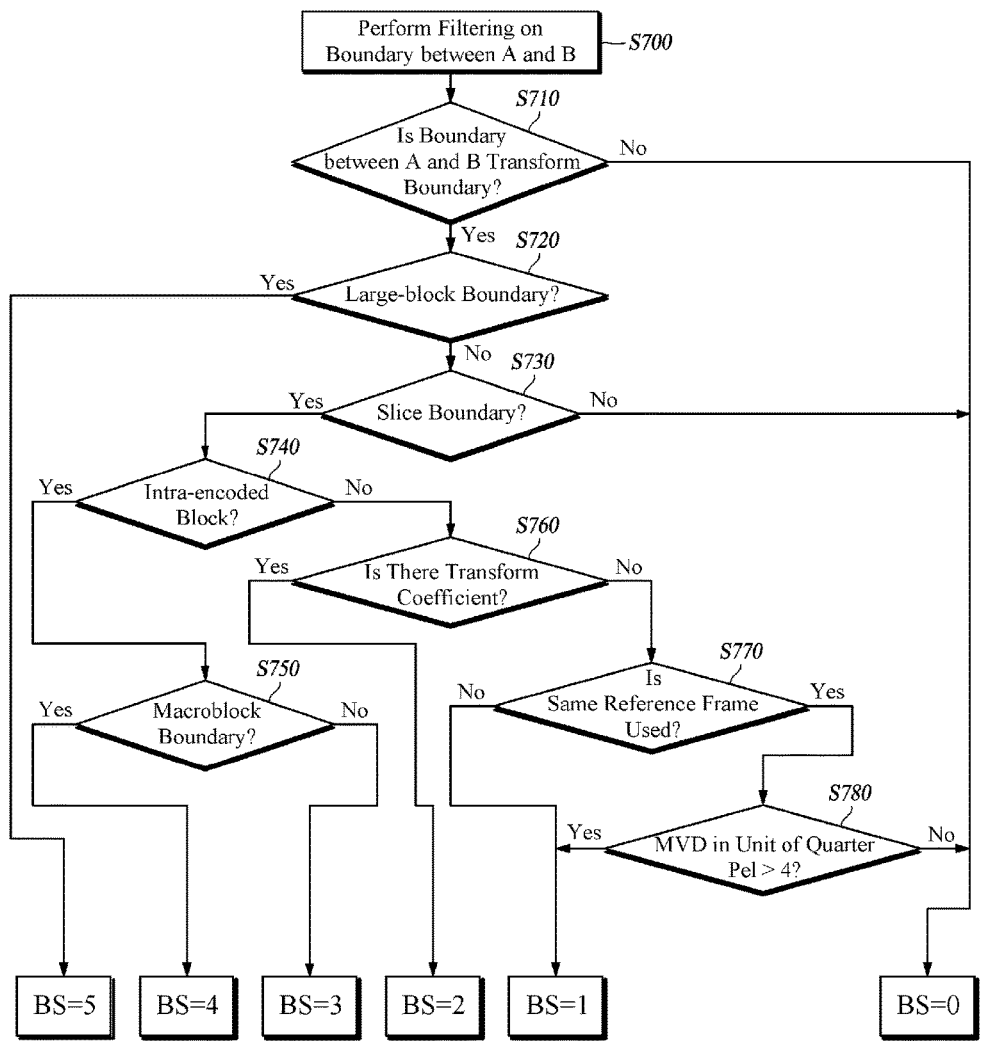
FIG. 7 is a diagram illustrating a process of identifying a filtering boundary and strength according to an embodiment of the present disclosure.

FIG. 6 is a diagram illustrating a method of determining an M×N macroblock type and transform type according to an embodiment of the present disclosure, and FIG. 7 is a diagram illustrating a process of identifying a filtering boundary and strength according to an embodiment of the present disclosure.

As illustrated in FIG. 6, a 16×16 macroblock may be divided into two 16×8 subblocks. Herein, a size of the macroblock is not limited to 16×16, but may be extended to M×N. In addition, a P×Q transform may be performed according to a block type. FIG. 6 illustrates two examples of a transform/quantization type (which may be a transform size) for a 16×8 block. Specifically, a transform for a 16×8 block may include one 16×8 transform or two 8×8 transforms. Herein, when the transform having the least information amount among the transforms of two sizes is used, the highest encoding efficiency can be achieved.

Selection of a transform type is described in detail. For example, if a block has a size of 16×8, a 16×8 transform may be used. If the 16×8 transform is divided into two 8×8 transforms, the transform with the best performance may be used. When a transform size is divided, a method of using a coded block pattern (CBP) value or inserting other information into a bitstream may be used and a method of determining it by a block type may also be used. In order to select an optimal transform for a block to be encoded, rate-distortion (RD) costs for a plurality of transform types of the block may be sequentially calculated, and a transform size with the least RD cost may be selected as a final transform size. For example, RD costs for a 16×8 transform, an 8×8 transform, an 8×4 transform, a 4×8 transform and a 4×4 transform of a 16×8 block may be sequentially calculated, and a transform size with the least RD cost may be selected as a final transform size.

Information on the transform size determined as above is used to perform deblocking filtering in accordance with a transform boundary. Since a blocking effect is generated differently according to transform sizes, a blocking boundary is identified prior to filtering. Whether the blocking boundary is an actual transform boundary may be identified by using information on a bitstream of a reconstructed block or other types of information on a transform included in a reconstructed block, prior to deblocking filtering. Herein, the identification is to set different boundary strengths.

According to an embodiment of the present disclosure, boundaries between transform blocks in a picture to be filtered (that is, transform boundaries) are identified first. When the transform boundaries are identified, a filtering strength and pixels of a filtering boundary region are determined in consideration of at least a size of two adjacent transform blocks forming each boundary.

Referring to FIG. 7, it is determined whether a boundary between a region A and a region B is a transform boundary or an edge of an actual image (S710). If the boundary corresponds to an edge of an actual image, a BS value is set to 0 and the boundary is not filtered. If not, the boundary is identified as a portion from which a blocking effect is removed. Thereafter, if filtering is necessary, it is determined whether the boundary is a large transform boundary (S720). In a region where filtering is performed on all boundaries according to a block size and transform, it is difficult to remove a blocking effect on a large transform or a block boundary by a conventional filtering strength (or boundary strength). This is because H.264/AVC performs encoding in units of a 16×16 macroblock to the maximum, and a transform size is unsuitable for an M×N block because it has a square transform. Herein, whether it is a transform boundary is identified in determining a filtering strength (S710). It is determined whether a large-block square or rectangular transform, which was not used in the conventional H.264/AVC, is applied (S720). If a large-block square or rectangular transform is applied, a filtering stronger than a conventional filtering (BS=5) is performed.

Herein, the large-block square or rectangular transform is more than 16×16, and in the case of a square or a rectangle, it can be applied to have the highest boundary strength. In some cases, a 16×8 or larger size or an 8×16 or larger size may be a reference size, and whether it is a large-size transform may be determined by various transform sizes; however, the embodiment of the present disclosure is not limited thereto. If it is not a large transform, a filtering strength determining process (S730 to S780) is similar to that of the conventional H.264/AVC, and thus a detailed description thereof will be omitted in order not to obscure the subject matters of the present disclosure. In addition, the embodiment of the present disclosure is not limited to the method illustrated in FIG. 7, and the transform boundary may be identified through other methods. Even when other methods are used, the transform boundary can be identified to have the same effect.

Figure 8:
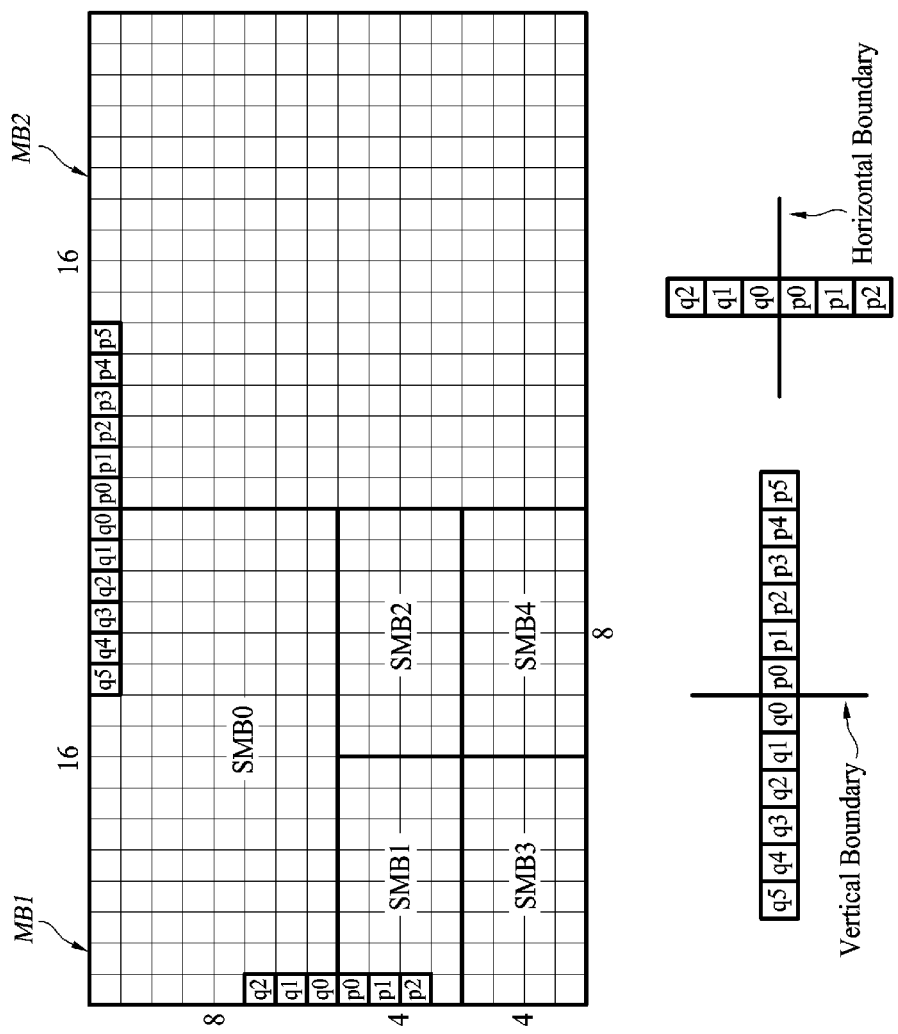
FIG. 8 is a diagram illustrating an example of a filtering method for large-block transform according to an embodiment of the present disclosure.

FIG. 8 is a diagram illustrating an example of a filtering method for large-block transform according to an embodiment of the present disclosure.

As illustrated in FIG. 8, if a rectangular transform is performed, up/down/left/right boundaries may have different types. For example, transform boundaries such as 16×16, 16×8 and 8×4 are illustrated in FIG. 8. In addition, a method of performing filtering by the filter 180 according to an embodiment of the present disclosure can also be similarly applied to 16×16, 16×8 and 8×4 transforms or extended P×Q transforms as illustrated in FIG. 8, as well as to 8×8 and 4×4 transforms. As for a boundary of a large block, if it is determined that the boundary is not an edge of an actual image, a blocking effect can be effectively removed by applying a deblocking filter to more pixels. A technology of determining whether a transform boundary is an edge of an actual image from a transform (block) boundary pixel is well known in the art, and thus a detailed description thereof will be omitted.

Hereinafter, an embodiment of the present disclosure in which a filtering strength or pixels to be filtered are selected according to a type or size of a transform used will be described in detail with reference to FIG. 8.

As described above, in the conventional H.264/AVC standard, only a 4×4 transform and an 8×8 transform are used, and a rectangular transform or a larger transform is not used. An embodiment of the present disclosure provides block boundary filtering or transform boundary filtering that is suitable for the case of using a rectangular transform or a transform larger than a conventional transform.

FIG. 8 illustrates two reproduced 16×16 macroblocks MB1 and MB2 prior to filtering. The left macroblock MB1 includes a 16×8 block SMB0 encoded and/or decided by using a 16×8 transform, and four 8×4 blocks SMB1, SMB2, SMB3 and SMB4 encoded and/or decoded by using a 8×4 transform. The right macroblock MB2 uses a 16×16 transform.

Since SMB0 is adjacent to MB2 in the horizontal direction, a boundary thereof is formed in the vertical direction. In addition, since SMB0 is adjacent to SMB1 and SMB2 in the vertical direction, a boundary thereof is formed in the horizontal direction.

A filter 960 of a video decoding apparatus 900 or the filter 180 of the video encoding apparatus 100 according to an embodiment of the present disclosure determines the position and/or the number of pixels in a transform block to be filtered, according to the size of at least one transform block or the sizes of two transform blocks forming a transform boundary or a boundary between transform blocks.

The filter 180/960 identifies the sizes of SMB0, SMB1, SMB2 and MB2 in order to filter a vertical boundary between SMB0 and MB2 and a horizontal boundary between SMB0 and SMb1 or SMB2. In particular, according to an embodiment of the present disclosure, the horizontal size (length) of SMB0 and MB2 is considered in order to filter the vertical boundary, and the vertical size (length) of SMB0, SMB1 and SMB2 is considered in order to filter the horizontal boundary.

Referring to FIG. 8, the horizontal length of SMB0 and MB2, that is, the number of pixels of the two blocks in the horizontal direction is 16. The vertical length of SMB0, that is, the number of pixels of SMB0 in the vertical direction is 8, and the number of pixels of SMB1 and SMB2 in the vertical direction is 4.

If a vertical boundary region between SMB0 and MB2 is filtered, the filter 180/960 filters six pixels q0, q1, q2, q3, q4 and q5 in SMB0 that are continuous in the horizontal direction from the vertical boundary, and filters six pixels p0, p1, p2, p3, p4 and p5 in MB2. On the other hand, in order to remove a block distortion present at the horizontal boundary between SMB0 and SMB1, the filter 180/960 filters three pixels p0, p1 and p3 in SMB1 that are continuous in the vertical direction from the horizontal boundary, and filters three pixels q0, q1 and q2 in SMB0. That is, as the size of a transform block increases, more pixels are filtered.

The filter 180/960 determines the position and/or the number of pixels in a transform block to be filtered, according to the size of at least one transform block or the sizes of two transform blocks forming a boundary between transform blocks. Filtering up to which pixel away from the boundary may be determined by the smaller block among the two transform blocks.

The video encoding apparatus 100 or the video decoding apparatus 900 may know a transform block size in various ways. For example, a transform block size may be indicated by a syntax element of a bitstream representing a block type including a transform block size or a size of a transform used in encoding or decoding a relevant transform block.

According to another embodiment of the present disclosure, the filter 180 of the video encoding apparatus 100 or the filter 960 of the video decoding apparatus 900 determines a filtering strength according to the size of at least one transform block or the sizes of two transform blocks forming a boundary between transform blocks.

As described above, the filter 180/960 identifies the sizes of SMB0, SMB1, SMB2 and MB2 in order to filter a vertical boundary between SMB0 and MB2 and a horizontal boundary between SMB0 and SMb1 or SMB2. In particular, according to an embodiment of the present disclosure, the horizontal size (length) of SMB0 and MB2 is considered for a filtering strength of the vertical boundary, and the vertical size (length) of SMB0, SMB1 and SMB2 is considered for a filtering strength of the horizontal boundary.

In the present embodiment, a filtering strength for a pixel in a block with a larger transform block size is higher than a filtering strength for a pixel in a block with a smaller transform block size. Thus, a filtering strength of the vertical boundary between SMB0 and Mb2 is greater than a filtering strength of the horizontal boundary between SMB0 and SMB1 and between SMB0 and SMB2.

When the filtering strength and the pixels to be filtered are determined as described above, the pixels of a block boundary region are filtered according to the filtering strength determined. A filtering method according to a filtering strength (BS) according to an embodiment of the present disclosure will be described below in detail. If the size of BS is smaller than 4, a filtering process is performed as Equation 1; and if the size of BS is 4, a filtering process is performed as Equation 2.

$$\Delta = \text{Clip}\left[-tc, tc, \frac{\{(q0-p0)<<2+(p1-q1)+4\}}{8}\right]$$ Equation 1

$$p'0 = p0 + \Delta$$

$$q'0 = q'0 + \Delta$$

Equation 1 is an example of when a BS is smaller than 4, and tc is determined by |p2−p1|, |q2−q0| and β determined by a quantization index. In the case of Clip[a, b, c], a Clip function is processed such that c is between a and b. That is, Clip of Equation 1 is processed such that ((q0−p0)<<2+(p1−q1)+4)/8 is between −tc and tc. As expressed in Equation 1, p'0 and q'0 may be obtained through 4-tap filtering using q1, q0, p0 and p1. Filtering of pixel values p'1 and q'1 may be performed through a method similar to a method of obtaining p'0 and q'0.

$$q'0 = \frac{1 \times q2 + 2 \times q1 + 2 \times q0 + 2 \times p0 + 1 \times p1 + 4}{8}$$ Equation 2

Equation 2 is an example of an equation for obtaining q'0 in the case of BS=4. Herein, 5-tap filtering is applied for a filtering coefficient value in the order of 1, 2, 2, 2, 1, and whether it is an actual edge is identified by α and β determined by a quantization index. Filtering applied to other pixels generates p'2~q'2 by using a method similar to the conventional H.264/AVC. Since the maximum number of pixels filtered is limited to 6 (6 for a luminance signal, and 4 for a chrominance signal), up to 3 pixels can be filtered according to the conventional method.

An embodiment of the present disclosure provides a filtering mode further including a boundary strength (for example, BS is called 5) in the case where a boundary strength varies according as a block size increases or a transform size varies. That is, as in the case of BS being 5, in the case of a large block transform, filtering illustrated in FIG. 8 is performed such that a deeper pixel is influenced. Since the number of conventional filtering pixels is not suitable for a block transform larger than a transform applied in the conventional filtering method, a blocking effect cannot be effectively reduced. Therefore, in an embodiment of the present disclosure, the number of conventional filtering pixels and the conventional filtering method are improved in order to solve the above problem.

Equation 3 is an example of a filtering method having more pixels.

$$q'0 = \frac{1 \times q3 + 2 \times q2 + 3 \times q1 + 4 \times q0 + 3 \times p0 + 2 \times p1 + 1 \times p2 + 8}{16}$$ Equation 3

Equation 3 is an equation for obtaining q'0 in a large block transform. Since the number of pixels involved in filtering is increased as compared to the conventional method and 7-tap filtering of 1, 2, 3, 4, 3, 2, 1 is performed, it is more influenced by adjacent pixels. Since a large block is filtered such that it is influenced by more adjacent pixels, a blocking effect can be reduced more effectively.

$$q'4 = \frac{4 \times q5 + 3 \times q4 + 3 \times q3 + 2 \times q2 + 2 \times q1 + 1 \times q0 + 1 \times p0 + 8}{16}$$ Equation 4

Equation 4 is an example of filtering a pixel q'4. In the case of a large transform size, since the pixel q'4 that is not filtered in the conventional technology is filtered, a video quality can be improved. This is to vary the number of pixels involved in filtering as a block size varies. In the embodiment of the present disclosure, a filtering method for the number of pixels to be filtered is not limited to the methods illustrated in the above equations, and various other filtering methods may be applied differently according to block types and transform types.

The embodiment of the present disclosure improves a filtering method for a transform boundary or a block boundary that can also be effectively applied to high-quality video coding to be developed in the future, by solving the problem of a conventional filtering method for a P×Q transform of an M×N block with respect to a deblocking filter that is a method for removing a conventional blocking effect. According to the embodiment of the present disclosure, filtering can be performed very effectively in removing a blocking effect at a transform boundary and a macroblock of every size.

As described above, when the video encoding apparatus 100 according to an embodiment of the present disclosure and the video encoding method using the same are used, a blocking effect can be removed more effectively by using information on an M×N transform, a P×Q transform, and a transform type. In this manner, the video encoded with encoded data by the video encoding apparatus 100 may be transmitted in real time or non-real-time to the video decoding apparatus to be described later where it is reconstructed and reproduced into the video after being transmitted via a wired/wireless communication network including the Internet, a short range wireless communication network, a wireless LAN network, a WiBro (Wireless Broadband, also known as WiMax) network, and mobile communication network or a communication interface such as cable or USB (universal serial bus).

Figure 9:
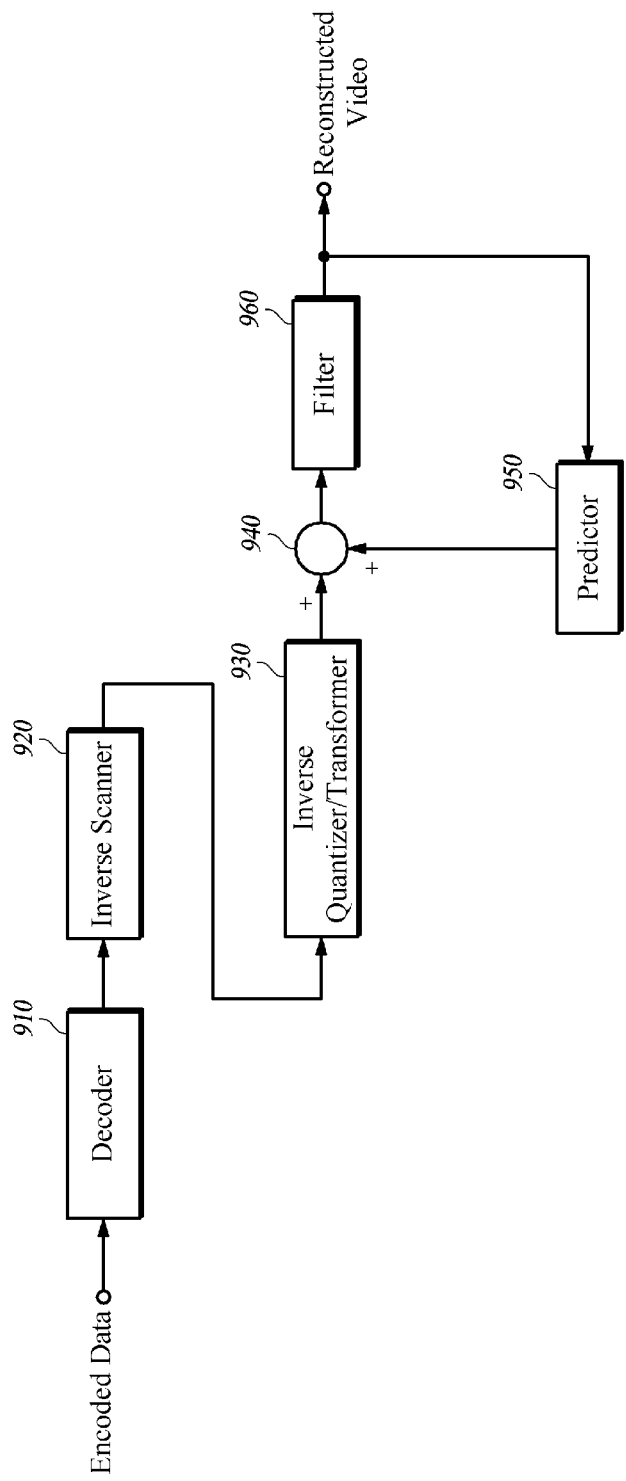
FIG. 9 is a block diagram illustrating a schematic configuration of a video decoding apparatus according to an embodiment of the present disclosure.

FIG. 9 is a block diagram illustrating a schematic configuration of a video decoding apparatus according to an embodiment of the present disclosure.

Like the video encoding apparatus 100 described with reference to FIG. 1, a video decoding apparatus 900 according to an embodiment of the present disclosure may be a personal computer (PC), a notebook computer, a television (TV), a personal digital assistant (PDA), a portable multimedia player (PMP), a PlayStation Portable (PSP), a mobile communication terminal, or a digital TV, and may represent a variety of apparatuses equipped with, for example, a communication device such as a modem for carrying out communications between various devices or wired/wireless communication networks, a memory for storing data and various programs for encoding images or videos, and a microprocessor for executing the programs to effect operations and controls.

A video decoding apparatus 900 according to an embodiment of the present disclosure may include a decoder 910, an inverse scanner 920, an inverse quantizer/transformer 930, a predictor 940, an adder 950, and a filter 960. Herein, the inverse scanner 920 and the filter 960 are not necessarily included but may be omitted selectively according to implementation modes. If the inverse scanner 920 is omitted, a function of the inverse scanner 920 may be integrated into the decoder 910.

The decoder 910 reconstructs a transformed/quantized residual block by decoding encoded data. Specifically, the decoder 910 reconstructs a quantized transform coefficient string by decoding encoded data. If a function of the scanner 140 is integrated into the encoder 150 in the video encoding apparatus 100, the inverse scanner 920 is omitted in the video decoding apparatus 900 and a function of the inverse scanner 920 is integrated into the decoder 910. Therefore, the decoder 910 may reconstruct a transformed/quantized residual block by inverse-scanning a reconstructed quantization coefficient string.

In addition, the decoder 910 may decode not only a transformed/quantized residual block but also information necessary for decoding by decoding encoded data. The information necessary for decoding refers to information necessary to decode an encoded bitstream in encoded data, and may include information on a block type, information on an intra prediction mode (if the prediction mode is an intra prediction mode), information on a motion vector (if the prediction mode is an inter prediction mode), information on a transform/quantization type, and various other information.

The information on a block type may be transmitted to the inverse quantizer/transformer 930 and the predictor 940. The information on a transform/quantization type may be transmitted to the inverse quantizer/transformer 930. Information necessary for prediction such as the information on an intra prediction mode and the information on a motion vector may be transmitted to the predictor 940.

When the decoder 910 reconstructs and transmits a quantized transform coefficient string, the inverse scanner 920 reconstructs a transformed/quantized residual block by inverse-scanning the quantized transform coefficient string.

The inverse scanner 920 generates a residual block with a quantization coefficient by inverse-scanning an extracted quantization coefficient string by various inverse scanning methods such as inverse zigzag scanning. Herein, information about a transform size is obtained from the decoder 910, and an inverse scanning method corresponding to the information is used to generate a residual block.

In addition, as described above, if a function of the scanner 140 is integrated in the encoder 150 in the video encoding apparatus 100, the inverse scanner 920 may also be omitted in the video decoding apparatus 900 and a function of the inverse scanner 140 may be integrated into the decoder 910. In addition, the decoder 910 or the inverse scanner 920 inverse-scans a transformed/quantized residual block according to a transform/quantization type identified by information on a transform/quantization type reconstructed by decoding encoded data by the decoder 910. Herein, since an inverse scanning method performed by the inverse scanner 920 according to the transform/quantization type is identical to or similar to an inversion of the method of scanning quantization transform coefficients of a transformed/quantized residual block by the scanner 140, a detailed description of the inverse scanning method will be omitted.

The inverse quantizer/transformer 930 reconstructs a residual block by inverse-quantizing/transforming a reconstructed transformed/quantized residual block. Herein, the inverse quantizer/transformer 930 inverse-quantizes/transforms a transformed/quantized residual block according to a transform/quantization type identified by information on a transform/quantization type received from the decoder 910. Herein, since a method of inverse-quantizing/transforming a transformed/quantized residual block by the inverse quantizer/transformer 930 according to a transform/quantization type is identical to or similar to an inversion of the transform/quantization process performed by the transformer/quantizer 130 of the video encoding apparatus 100 according to a transform/quantization type, a detailed description of the inverse quantization/transform method will be omitted.

The predictor 940 generates a predicted block by predicting a current block. Herein, the predictor 940 predicts the current block by using information necessary for prediction and information on a block type received from the decoder 910. That is, the predictor 940 generates a predicted block by determining a size and type of the current block according to a block type identified by information on a block type and predicting a current block by using a motion vector or an intra prediction mode identified by information necessary for prediction. Herein, the predictor 940 may generate the predicted block by combining predicted subblocks generated by dividing the current block into subblocks and predicting the respective subblocks.

The adder 950 reconstruct the current block by adding the residual block reconstructed by the inverse quantizer/transformer 930 and the predicted block generated by the predictor 940.

The filter 960 filters the current block reconstructed by the adder 950, and the current block reconstructed and filtered is accumulated in units of a picture and stored as a reference picture in a memory (not illustrated) and used by the predictor 940 to predict a next block or a next picture.

Here, in the filtering, different filtering boundary strengths may be determined with respect to a boundary between transforms, a boundary between a block and a transform, and a boundary between blocks.

In addition, the filtering may be performed in the case of no edge in the boundary and the boundary strength may be determined according to a transform and quantization type. Herein, if the transform/quantization type is larger than 16×8 or 8×16, the greatest boundary strength may be provided.

As a transform/quantization size increases, the number of pixels involved in filtering may increase. The filter 960 may perform filtering by using information about a transform/quantization type transmitted together with a reconstructed current block.

When filtering a reconstructed current block, the filter 960 may perform the filtering according to a transform/quantization type identified by information on a transform/quantization type received from the decoder 910. Herein, the filter 960 may perform a deblocking filtering on a transform boundary or a block boundary differently according to transform/quantization types, to reduce a blocking effect generated at a block boundary of an image. Since a filtering method of the filter 960 is identical to or similar to the deblocking filtering process performed by the filter 180 of the video encoding apparatus 100, a detailed description of the filtering method will be omitted.

A video encoding/decoding apparatus according to an embodiment of the present disclosure may be implemented by combining the video encoding apparatus 100 of FIG. 1 and the video decoding apparatus 900 of FIG. 9.

A video encoding/decoding apparatus according to an embodiment of the present disclosure may include a video encoder 100 (that is, a video encoding unit in the video encoding/decoding apparatus according to an embodiment of the present disclosure) and a video decoder 900 (that is, a video decoding unit in the video encoding/decoding apparatus according to an embodiment of the present disclosure). The video encoder 100 may include a predictor 110 for generating a predicted block by predicting a current block, a subtractor 120 for generating a residual block by subtracting the predicted block from the current block, a transformer/quantizer 130 for determining a transform/quantization type selected according to a block type of the current block and transforming/quantizing the residual block according to the transform/quantization type determined; an encoder 150 for generating encoded video data by encoding a transformed/quantized residual block; an inverse quantizer/transformer 160 for reconstructing a residual block by inverse-quantizing/transforming the transformed/quantized residual block; an adder 170 for generating a reconstructed block by adding the predicted block to the residual block reconstructed; and a filter 180 for filtering the reconstructed block according to the transform/quantization type. The video decoder 900 may include a decoder 910 for reconstructing a transformed/quantized residual block by decoding encoded data; an inverse quantizer/transformer 930 for reconstructing the residual block by inverse-quantizing/transforming the transformed/quantized residual block according to a transform/quantization type; a predictor 940 for generating a predicted block by predicting a current block; an adder 950 for reconstructing the current block by adding a reconstructed residual block and the predicted block; and a filter 950 for filtering a boundary region between a reconstructed current block and an adjacent block according to the transform/quantization type.

Here, in the filtering method for reducing a video data quantization effect of the video encoding apparatus 100 and the video decoding apparatus 900, the filtering method of the filter 180 and the filter 960 in the video encoding apparatus 100 and the video decoding apparatus 900 performs filtering in the horizontal direction and then in the vertical direction or performs filtering in the vertical direction and then in the horizontal direction, in order to prevent a value mismatch after the filtering operation of the video encoding apparatus 100 and the video decoding apparatus 900. This deblocking filtering sequence may be determined as the same sequence in the video encoding apparatus 100 and the video decoding apparatus 900.

Figure 10:
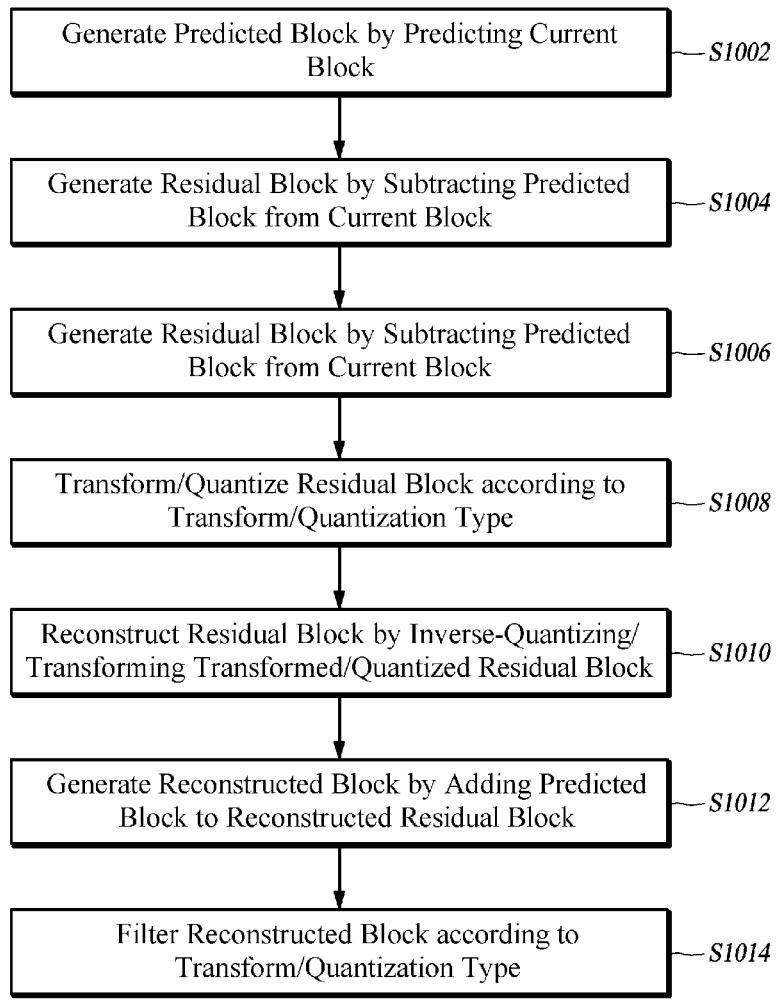
FIG. 10 is a flow diagram illustrating a video encoding method according to an embodiment of the present disclosure.

FIG. 10 is a flow diagram illustrating a video encoding method according to an embodiment of the present disclosure.

A video encoding method according to an embodiment of the present disclosure may include: generating a predicted block by predicting a current block (1002); generating a residual block by subtracting the predicted block from the current block (1004); determining a transform/quantization type selected according to a block type of the current block (1006); transforming/quantizing the residual block according to the transform/quantization type determined (1008); generating encoded video data by encoding a transformed/quantized residual block (1010); reconstructing a residual block by inverse-quantizing/transforming the transformed/quantized residual block (1012); generating a reconstructed block by adding the predicted block to a reconstructed residual block (1014); and filtering a boundary region between the reconstructed block and an adjacent block according to the transform/quantization type (1016).

Herein, the filtering may determine different filtering boundary strengths with respect to a boundary between transforms, a boundary between a block and a transform, and a boundary between blocks.

Herein, the filtering may be performed in the case of no edge in the boundary, and the boundary strength may be determined according to a transform and quantization type.

In addition, if the transform/quantization type is larger than 16×8 or 8×16, the greatest boundary strength may be provided.

In the filtering, boundary pixels involved in the filtering may be determined according to a transform size, and the number of pixels involved in the filtering may increase with an increase in the transform/quantization size.

In the transform/quantization, information on a transform/quantization type may be generated.

Rate-distortion (RD) costs for a plurality of transform types of the residual block may be calculated, and a transform type with the least RD cost calculated may be selected as a transform/quantization type.

The transform type may be P×Q (P and Q may be different from each other), and P and Q may be equal to or larger than 16. That is, a size of one side of a block may be equal to or larger than 16.

The filtering may be performed by using information on a transform/quantization type transmitted together with a reconstructed block.

The filtering may be performed after it is determined whether a boundary between the reconstructed block and the adjacent block is a transform boundary. If the boundary is a transform boundary, the boundary region may be filtered; and if the boundary does not correspond to an edge of an image, the filtering may be performed.

In the transform/quantization, information on a transform/quantization type may be generated.

Herein, the filtering may be performed in the same order as in a video decoding method.

Figure 11:
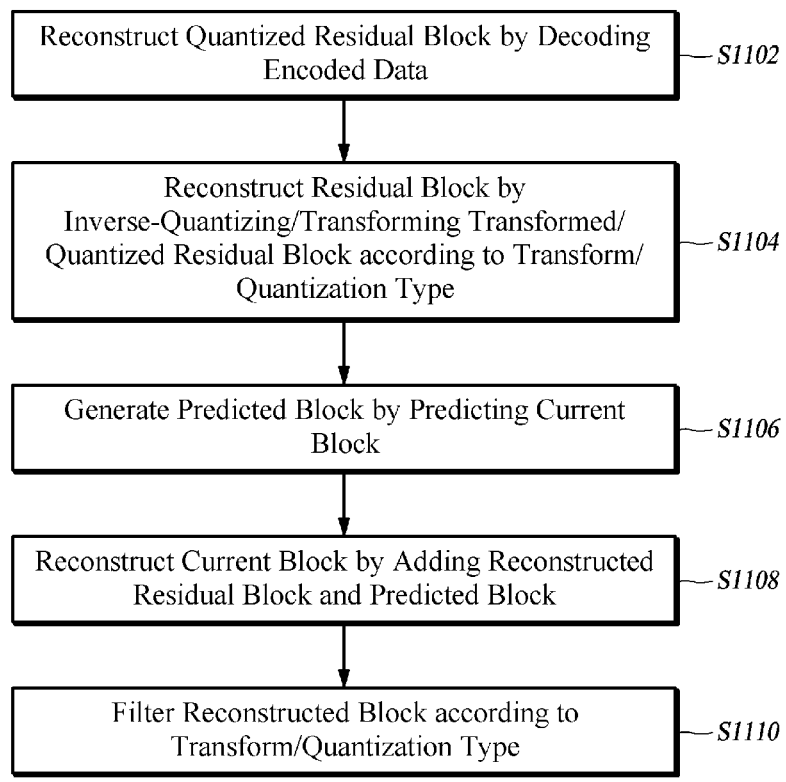
FIG. 11 is a flow diagram illustrating a video decoding method according to an embodiment of the present disclosure.

FIG. 11 is a flow diagram illustrating a video decoding method according to an embodiment of the present disclosure.

A video decoding method according to an embodiment of the present disclosure may include: outputting a transformed/quantized residual block by decoding encoded data (1102); decoding a residual block by inverse-quantizing/transforming the transformed/quantized residual block according to a transform/quantization type (1104); generating a predicted block by predicting a current block (1106); reconstructing the current block by adding a decoded residual block and the predicted block (1108); and filtering a reconstructed current block according to the transform/quantization type (1110).

The filtering may determine different filtering boundary strengths with respect to a boundary between transforms, a boundary between a block and a transform, and a boundary between blocks.

The filtering may be performed after it is determined whether a boundary between the reconstructed current block and the adjacent block is a transform boundary. If the boundary is a transform boundary, the boundary region may be filtered; and if the boundary does not correspond to an edge of an image, the filtering may be performed.

Herein, the filtering may be performed in the case of no edge in the boundary, and the boundary strength may be determined according to a transform and quantization type.

In addition, if the transform/quantization type is larger than 16×8 or 8×16, the greatest boundary strength may be provided.

In the filtering, boundary pixels involved in the filtering may be determined according to a transform size, and the number of pixels involved in the filtering may increase with an increase in the transform/quantization size.

The filtering may be selected according information of a transform type included in the encoded data among a plurality of transform types. That is, information on a transform/quantization type may be generated in the inverse quantization/transform after the decoding of the encoded data, and the filtering may be performed by using information on a transform/quantization type transmitted together with the reconstructed current block.

The filtering may be performed in the same order as in the video encoding method.

A video encoding/decoding method according to an embodiment of the present disclosure may be implemented by combining a video encoding method according to an embodiment of the present disclosure and a video decoding method according to an embodiment of the present disclosure.

A video encoding/decoding method according to an embodiment of the present disclosure may include: a video encoding method according to an embodiment of the present disclosure for generating a predicted block by predicting a current block, generating a residual block by subtracting the predicted block from the current block, determining a transform/quantization type selected according to a block type of the current block, transforming/quantizing the residual block according to the transform/quantization type determined, generating encoded video data by encoding a transformed/quantized residual block, reconstructing a residual block by inverse-quantizing/transforming the transformed/quantized residual block, generating a reconstructed block by adding the predicted block to a reconstructed residual block, and filtering the reconstructed block according to the transform/quantization type; and a video decoding method according to an embodiment of the present disclosure for outputting a transformed/quantized residual block by decoding encoded data, decoding a residual block by inverse-quantizing/transforming the transformed/quantized residual block according to a transform/quantization type, generating a predicted block by predicting a current block, reconstructing the current block by adding a decoded residual block and the predicted block, and filtering a boundary of a reconstructed current block according to the transform/quantization type.

Figure 12:
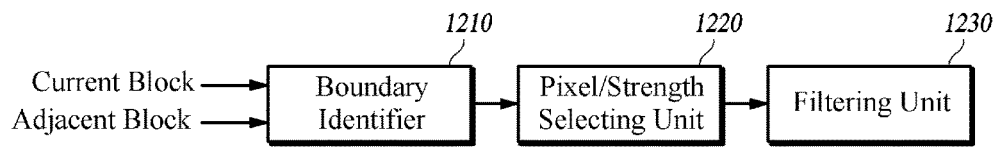
FIG. 12 is a block diagram illustrating an image filtering apparatus according to an embodiment of the present disclosure.

FIG. 12 is a block diagram illustrating an image filtering apparatus according to an embodiment of the present disclosure.

An image filtering apparatus according to an embodiment of the present disclosure may include a boundary identifier 1210, a pixel/strength selecting unit 1220, and a filtering unit 1230.

The boundary identifier 1210 identifies a boundary between two transform blocks included in an image.

The pixel/strength selecting unit 1220 selects one or more pixels to be filtered, according to a size of at least one transform block among the two transform blocks.

The filtering unit 1230 filters at least one pixel included in a region adjacent to the boundary.

In another embodiment, the pixel/strength selecting unit 1220 may select a filtering strength according to a size of at least one transform block among the two transform blocks.

The image filtering apparatus according to an embodiment of the present disclosure may be used as the filter 180 in the video encoding apparatus according to an embodiment of the present disclosure or the filter 960 in the video decoding apparatus according to an embodiment of the present disclosure.

The boundary identifier 1210 may be used to identify a boundary between two transform blocks included in an image in the filter 180/960. That is, the boundary identifier 1210 may be used to identify a boundary region between a current block and an adjacent block. Herein, although identifying a boundary between a reconstructed block and an adjacent block is exemplified, the present disclosure is not limited thereto and it may be used for any purpose of identifying a boundary between two blocks. Since a method of identifying a boundary between two blocks has been described above with reference to the drawings including FIG. 8 and the above equations, a detailed description thereof will be omitted herein.

The pixel/strength selecting unit 1220 may select a pixel to be filtered according to a size of at least one transform block among the two blocks, or may select a filtering strength according to a size of at least one transform block among the two blocks. Since a method of selecting a pixel to be filtered according to a size of a transform block or selecting a filtering strength according to a size of a transform block has been described above with reference to the drawings including FIG. 8 and the above equations, a detailed description thereof will be omitted herein.

The filtering unit 1230 filters at least one pixel included in a region adjacent to the boundary. Since the filtering method has been described above with reference to the drawings including FIG. 8 and the above equations, a detailed description thereof will be omitted herein.

The size of at least one transform block may be a length of at least one transform block in a perpendicular direction with respect to the boundary.

In addition, the size of at least one transform block may be proportional to the number of pixels to be filtered. The size of at least one transform block may be proportional to the filtering strength.

Figure 13:
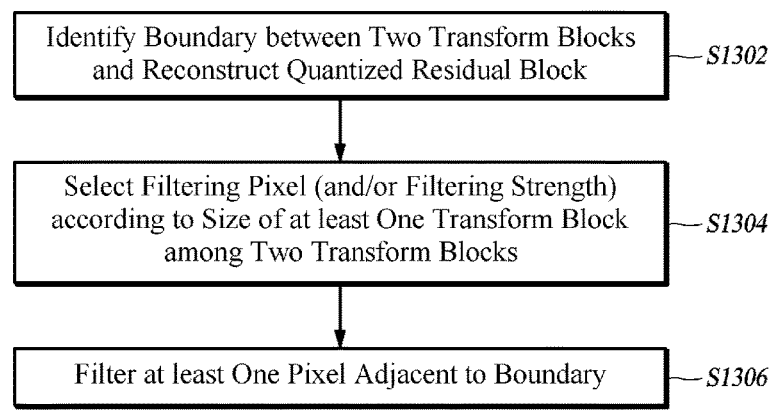
FIG. 13 is a flow diagram illustrating an image filtering method according to an embodiment of the present disclosure.

FIG. 13 is a flow diagram illustrating an image filtering method according to an embodiment of the present disclosure.

First, a boundary between two transform blocks included in an image is identified (S1302).

Thereafter, a pixel to be filtered (and/or a filtering strength) is selected according to a size of at least one transform block among two transform blocks (S1304), and a pixel included in a region adjacent to the boundary is filtered (S1306).

The method of step S1302 may be used as a method for identifying a boundary between two transform blocks included in an image in the filter 180/960. That is, the boundary identifier 1210 may be used to identify a boundary region between a current block and an adjacent block. Herein, although identifying a boundary between a reconstructed block and an adjacent block is exemplified, the present disclosure is not limited thereto and it may be used for any purpose of identifying a boundary between two blocks. Since a method of identifying a boundary between two blocks has been described above with reference to the drawings including FIG. 8 and the above equations, a detailed description thereof will be omitted herein.

In step S1304, a pixel to be filtered (and/or a filtering strength) may be selected according to a size of at least one transform block among two transform blocks. Since a method of selecting a pixel to be filtered according to a size of a transform block or selecting a filtering strength according to a size of a transform block has been described above with reference to the drawings including FIG. 8 and the above equations, a detailed description thereof will be omitted herein.

In step S1306, at least one pixel included in a region adjacent to the boundary is filtered. Since the filtering method has been described above with reference to the drawings including FIG. 8 and the above equations, a detailed description thereof will be omitted herein.

Herein, the size of at least one transform block may be a length of at least one transform block in a perpendicular direction with respect to the boundary.

In addition, the size of at least one transform block may be proportional to the number of pixels to be filtered. The size of at least one transform block may be proportional to the filtering strength.

In the description above, although all of the components of the embodiments of the present disclosure may have been described as assembled or operatively connected as a unit, the present disclosure is not intended to limit itself to such embodiments. Rather, within the objective scope of the present disclosure, the respective components may be selectively and operatively combined in any numbers. Every one of the components may also be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure can be applied to the technology of encoding/decoding a video in various block sizes and transform sizes, to reduce a blocking effect that is caused by lossy compression through transform/quantization, and is highly useful in a video encoding/decoding apparatus requiring an improved video quality.

CROSS-REFERENCE TO RELATED APPLICATION

If applicable, this application claims priorities under 35 U.S.C §119(a) of Patent Application No. 10-2010-0044687, filed on May 12, 2010 and Patent Application No. 10-2010-0047302, filed on May 20, 2010 in Korea, the entire contents of which are incorporated herein by reference. In addition, this non-provisional application claims priorities in countries, other than the U.S., with the same reason based on the Korean Patent Applications, the entire contents of which are hereby incorporated by reference.

The invention claimed is:

1. A video decoding apparatus for decoding a current block larger than 16×16, the apparatus comprising:
a decoder configured to
extract information on a size of the current block from encoded data and thereby variably decide the size of the current block and a size of a transformed/quantized residual block which is same as the size of the current block, wherein the current block is a macroblock in which a prediction type is designated among an inter-prediction type and an intra-prediction type, and the variably decided size of the current block includes a size larger than 16×16, and
extract information on a transform type for identifying transform blocks within the transformed/quantized residual block by decoding the encoded data, wherein the decoder variably determines a transform size corresponding to a size of each transform block depending on the size of the current block and the information on the transform type and thereby allows the transformed/quantized residual block to be divided into a plurality of transform blocks having various transform sizes,
reconstruct, from the encoded data, the transformed/quantized residual block;
an inverse quantizing/transforming unit configured to reconstruct a residual block corresponding to each of the transform blocks by inverse-quantizing/transforming the transformed/quantized residual block in the unit of the transform sizes of the transform blocks variably determined based on the size of the current block and the information on the transform type;
a predictor configured to generate a predicted block by an intra-prediction;
an adder configured to reconstruct the current block by adding the reconstructed residual block and the predicted block; and
a filtering unit configured to filter a transform boundary between a transform block in the reconstructed current block and an adjacent transform block by identifying the transform boundary according to the transform sizes of the transform blocks variably determined based on the size of the current block and the information on the transform type,
wherein the transformed/quantized residual block is divided into the transform blocks, by identifying whether the transformed/quantized residual block is divided into a plurality of transform blocks and then recursively identifying whether each of divided transform blocks is further divided, depending on the information on the transform type, and
wherein the decoder is configured to reconstruct the transformed/quantized residual block by scanning transform coefficients corresponding to each of the transform blocks in the transformed/quantized residual block according to a scanning pattern corresponding to each of the transform blocks, wherein the scanning pattern is determined based on the size of each of the transform blocks.

2. The video decoding apparatus of claim 1, wherein the filtering unit is configured to determine whether a boundary between the reconstructed current block and the adjacent block is the transform boundary.

3. The video decoding apparatus of claim 1, wherein the filtering unit is configured to perform the filtering if the transform boundary does not correspond to an edge of a video.

4. The video decoding apparatus of claim 1, wherein the filtering unit is configured to determine a boundary strength according to the transform size.

5. The video decoding apparatus of claim 4, wherein the filtering unit is configured to determine boundary pixels involved in the filtering according to the transform size.

6. The video decoding apparatus of claim 1, wherein a size of one side of the transform block which is transformed/quantized is equal to or larger than 16.

7. The video decoding apparatus of claim 1, wherein the filtering unit is configured to perform the filtering in the same order as in a video encoding apparatus that generated the encoded data.

8. A video decoding method for decoding a current block larger than 16×16, the method comprising:
extracting information on a size of the current block from encoded data and thereby variably deciding the size of the current block and a size of a transformed/quantized residual block which is same as the size of the current block, wherein the current block is a macroblock in which a prediction type is designated among an inter-prediction type and an intra-prediction type, and the variably decided size of the current block includes a size larger than 16×16;
extracting information on a transform type for identifying transform blocks within the transformed/quantized residual block by decoding the encoded data, wherein a transform size corresponding to a size of each transform block is variably determined depending on the size of the current block and the information on the transform type and thereby the transformed/quantized residual block is allowed to be divided into a plurality of transform blocks having various transform sizes;
reconstructing, from the encoded data, the transformed/quantized residual block;
reconstructing a residual block corresponding to each of the transform blocks by inverse-quantizing/transforming the transformed/quantized residual block in the unit of the transform sizes of the transform blocks variably determined based on the size of the current block and the information on the transform type;
generating a predicted block by using an intra-prediction;
reconstructing the current block by adding the reconstructed residual block and the predicted block; and
filtering a transform boundary of the reconstructed current block by identifying the transform boundary according to the transform sizes of the transform blocks variably determined based on the size of the current block and the information on the transform type,
wherein the transformed/quantized residual block is divided into the transform blocks, by identifying whether the transformed/quantized residual block is divided into a plurality of transform blocks and then recursively identifying whether each of divided transform blocks is further divided, depending on the information on the transform type, and
wherein the transformed/quantized residual block is reconstructed by scanning transform coefficients corresponding to each of the transform blocks in the transformed/quantized residual block according to a scanning pattern corresponding to each of the transform blocks, wherein the scanning pattern is determined based on the size of each of the transform blocks.

9. The video decoding apparatus of claim 1, wherein the filtering unit is further configured to decide whether to filter the transform boundary.

10. The video decoding apparatus of claim 9, wherein the filtering unit is further configured to filter the transform boundary when the transform boundary does not correspond to an edge of an actual image.

11. The video decoding method of claim 8, wherein the filtering the transform boundary comprises deciding whether to filter the transform boundary.

12. The video decoding method of claim 11, wherein the filtering further comprises filtering the transform boundary when the transform boundary does not correspond to an edge of an actual image.

* * * * *